(12) United States Patent
Jia et al.

(10) Patent No.: US 11,394,533 B2
(45) Date of Patent: Jul. 19, 2022

(54) METHOD FOR STORING DATABASE SECURITY AUDIT RECORDS

(71) Applicant: General Data Technology Co., Ltd., Tianjin (CN)

(72) Inventors: Xinquan Jia, Tianjin (CN); Wenting Chen, Tianjin (CN); Xuesong Wang, Tianjin (CN); Xun Lv, Tianjin (CN)

(73) Assignee: General Data Technology Co., Ltd., Tianjin (CN)

( * ) Notice: Subject to any disclaimer, the term of this patent is extended or adjusted under 35 U.S.C. 154(b) by 324 days.

(21) Appl. No.: 16/853,799

(22) Filed: Apr. 21, 2020

(65) Prior Publication Data

US 2021/0203487 A1 Jul. 1, 2021

(30) Foreign Application Priority Data

Dec. 25, 2019 (CN) .......................... 201911359752.6

(51) Int. Cl.
*G06F 7/04* (2006.01)
*H04L 9/08* (2006.01)
(Continued)

(52) U.S. Cl.
CPC ........ *H04L 9/0825* (2013.01); *G06F 11/1451* (2013.01); *G06F 11/1464* (2013.01);
(Continued)

(58) Field of Classification Search
CPC ............. G06F 11/1451; G06F 11/1464; G06F 11/1469; G06F 16/2246; G06F 2201/80; H04L 67/104; H04L 9/0637; H04L 9/0825; H04L 9/3236
See application file for complete search history.

(56) References Cited

U.S. PATENT DOCUMENTS 7,346,929 B1 * 3/2008 Hammond ............ G06F 21/552
713/188
7,983,421 B2 * 7/2011 Chandrasekaran ... H04L 9/0891
709/224

(Continued)

FOREIGN PATENT DOCUMENTS

| CN | 107480509 A | 12/2017 |
| CN | 109885554 A | 6/2019 |
| CN | 110266475 A | 9/2019 |

*Primary Examiner* — Gary S Gracia
(74) *Attorney, Agent, or Firm* — True Shepherd LLC; Andrew C. Cheng

(57) ABSTRACT

A method for storing database security audit records, comprises: S1, when a database server recognizes an auditable event to generate one database security audit record, identifying the database security audit record with a hashed value so that each database security audit record corresponds to a unique hashed value respectively; S2, packaging multiple database security audit records into a database security audit record block; and S3, transmitting the database security audit record block in encrypted way by adopting a peer-to-peer protocol for direct network communication between two nodes, and verifying an ownership of the database security audit record block. The disclosure has the beneficial effects that through an encryption mechanism and a consensus mechanism, storage of database security audit records is achieved in a peer-to-peer network, thereby ensuring that the database security audit records cannot be tampered and forged.

6 Claims, 3 Drawing Sheets

(51) Int. Cl.
  *G06F 16/22*    (2019.01)
  *G06F 16/17*    (2019.01)
  *G06F 11/14*    (2006.01)
  *H04L 9/06*     (2006.01)
  *H04L 9/32*     (2006.01)
  *H04L 67/104*   (2022.01)
  *G06F 17/00*    (2019.01)

(52) U.S. Cl.
  CPC ...... *G06F 11/1469* (2013.01); *G06F 16/1734* (2019.01); *G06F 16/2246* (2019.01); *H04L 9/0637* (2013.01); *H04L 9/3236* (2013.01); *H04L 67/104* (2013.01); *G06F 2201/80* (2013.01)

(56) References Cited

U.S. PATENT DOCUMENTS

| | | | | |
|---|---|---|---|---|
| 8,010,494 B2 * | 8/2011 | Chandrasekaran | | G06F 16/2358 707/648 |
| 8,095,962 B2 * | 1/2012 | Condon | | G06F 21/577 380/247 |
| 10,897,361 B1 * | 1/2021 | Miller | | H04L 9/0894 |
| 2005/0004899 A1 * | 1/2005 | Baldwin | | G06F 21/552 |
| 2006/0248599 A1 * | 11/2006 | Sack | | H04L 63/102 707/999.009 |
| 2007/0266032 A1 * | 11/2007 | Blumenau | | G06F 16/93 |
| 2008/0104407 A1 * | 5/2008 | Horne | | G06F 21/33 713/178 |
| 2009/0070361 A1 * | 3/2009 | Haber | | G06F 21/6254 707/999.102 |
| 2011/0307707 A1 * | 12/2011 | Fielder | | H04L 9/3228 713/181 |
| 2014/0130170 A1 * | 5/2014 | Kuo | | G06F 21/577 726/25 |
| 2014/0337971 A1 * | 11/2014 | Casassa Mont | | G06F 21/552 726/22 |
| 2015/0120213 A1 * | 4/2015 | Nettesheim | | G01N 27/04 702/27 |
| 2017/0288876 A1 * | 10/2017 | Dragone | | H04L 9/3247 |
| 2017/0346847 A1 * | 11/2017 | Borohovski | | G06F 21/577 |
| 2019/0188702 A1 * | 6/2019 | Bolla | | H04L 9/30 |
| 2020/0051350 A1 * | 2/2020 | Von Zwehl | | G08B 13/19697 |

\* cited by examiner

| Hashed value | Audit event | Timestamp | Host name | Database server name | User name | Additional field |

FIG. 2

METHOD FOR STORING DATABASE SECURITY AUDIT RECORDS

CROSS-REFERENCE TO RELATED APPLICATIONS

This application claims priority to Chinese Patent Application No. 201911359752.6 with a filing date of Dec. 25, 2019. The content of the aforementioned applications, including any intervening amendments thereto, are incorporated herein by reference.

TECHNICAL FIELD

The disclosure belongs to the field of computer application, and particularly relates to a method for storing database security audit records.

BACKGROUND OF THE PRESENT INVENTION

China national standard GB/T25069-2010 (information Security Technology-Glossary) defines that security audit refers to detection, information acquisition and analysis on various events and behaviors of an information system and corresponding actions are taken for specific events and behaviors.

It is allowed to monitor the activities of users and find out any malevolent activity performed by a user who is not authorized according to properties of database security audit. As long as the user knows his/her own activity is possibly subjected to security audit, a database security audit mechanism can terrorize unpopular activities.

When a database server encounters an auditable event, one database security audit record is generated and recorded in an audit document under a specified catalogue in a computer network. The user who has been authorized can open the audit document, which possibly modifies by mistake or damages the audit document.

SUMMARY OF PRESENT INVENTION

Aiming at the defects in the prior art, an object of the disclosure is to provide a method for storing database security audit records.

In order to achieve the above purpose, the technical solutions of the disclosure are as follows:

A method for storing database security audit records, comprising:

S1, when a database server recognizes an auditable event to generate one database security audit record, identifying the database security audit record with a hashed value so that each database security audit record corresponds to a unique hashed value respectively;

S2, packaging multiple database security audit records into a database security audit record block;

S3, transmitting the database security audit record block in encrypted way by adopting a peer-to-peer protocol for direct network communication between two nodes, and verifying an ownership of the database security audit record block; wherein after a new database security audit record block is generated, a node for generating the new database security audit record block broadcasts the new generated database security audit record block to other nodes of the whole network through the peer-to-peer network;

S4, a node for receiving the database security audit record block verifying validity of the database security audit record block, connecting a valid database security audit record block to a database security audit record chain, and forwarding the valid database security audit record block to adjacent nodes;

S5, verifying consistency of the database security audit record chains of different nodes; and S6, storing the full backup of the database security audit record chains on all nodes, and storing multiple database security audit records in a balanced binary tree structure by each database security audit record block.

Further, a data structure of the database security audit record in the step S1 comprises:

the hashed value acting as a unique identifier of the database security audit record;

the audit event for identifying an event code;

a timestamp for identifying time when the audit event occurs;

a host name for identifying a name of the host for executing the audit event;

a database server name for identifying a name of the database server on which the audit event runs;

a user name for identifying a login name of a user requesting the audit event; and an additional field for identifying an arbitrary field of databases, tables and the like for database security audit analysis.

Further, a specific method for generating the database security audit record block in the step S2 comprises:

S21, dividing a database security audit record block into a database security audit record block head and a database security audit record block body, wherein the database security audit record block head comprises the hashed value; a timestamp and a balanced binary tree root of the current database security audit record block, and the hashed value of a previous database security audit record block; and the database security audit record block body comprises several database security audit records;

S22, storing the several database security audit records in the database security audit record block body in the balanced binary tree structure, wherein each leaf of the balanced binary tree is the hashed value of one database security audit record respectively; and S23, performing hashing operation recursively to hashed values of every two database security audit records to obtain a new hashed value and storing the new hashed value into the balanced binary tree until every two hashed values are combined to finally form one hashed value, namely the balanced binary tree root.

Further, in the step S4, the database security audit record chain is a data structure formed by orderly connecting the database security audit record blocks from back to front according to an order of time when the database security audit record blocks are generated.

Further, a method for verifying the database security audit record block in the step S4 comprises:

S41, verifying the ownership of database security audit record block by adopting an asymmetric cryptographic algorithm, wherein the asymmetric cryptographic algorithm includes a public key and a private key, namely, the public key of one node is public to other nodes, the private key is confidential to other nodes, and the private key is configured to be unavailable to the other nodes through calculations according to the public key; and S42, checking a timestamp and a database security audit record structure of the new database security audit record block according to a predefined standard.

Further, a method for verifying the database security audit record chain in the step S5 is as follows: verifying the consistency of the database security audit record chains of different nodes by adopting a proof of stake consensus algorithm.

Compared with the prior art, the disclosure has the following advantages:

The disclosure has the beneficial effects that multiple nodes in the peer-to-peer network all store the database security audit records, each node stores full database security audit record chains and can participate in the validity verification of the database security audit record block; the modification of the database security audit record chain on a single node is invalid, and the proof of stake consensus algorithm ensures that the error of this node can be jointly corrected by other nodes; the ownership verification of the database security audit record block is performed by adopting the asymmetric encryption algorithm to ensure the security of the transmission and access of the database security audit record blocks. Through the encryption mechanism and the consensus mechanism, the disclosure realizes the storage of the database security audit records in the peer-to-peer network, thereby ensuring that the database security audit records can not be tampered and forged.

DESCRIPTION OF THE DRAWINGS

Accompanying drawings constituting one part of the disclosure are for the purpose of further understanding to the disclosure, exemplary embodiments of the disclosure and illustration thereof are for the purpose of explaining the disclosure, but not constituting improper limitation to the disclosure. In the drawings:

FIG. 2 is a diagram showing a data structure of a database security audit record according to an embodiment of the disclosure.

DETAILED DESCRIPTION OF PREFERRED EMBODIMENTS

Figure 1:
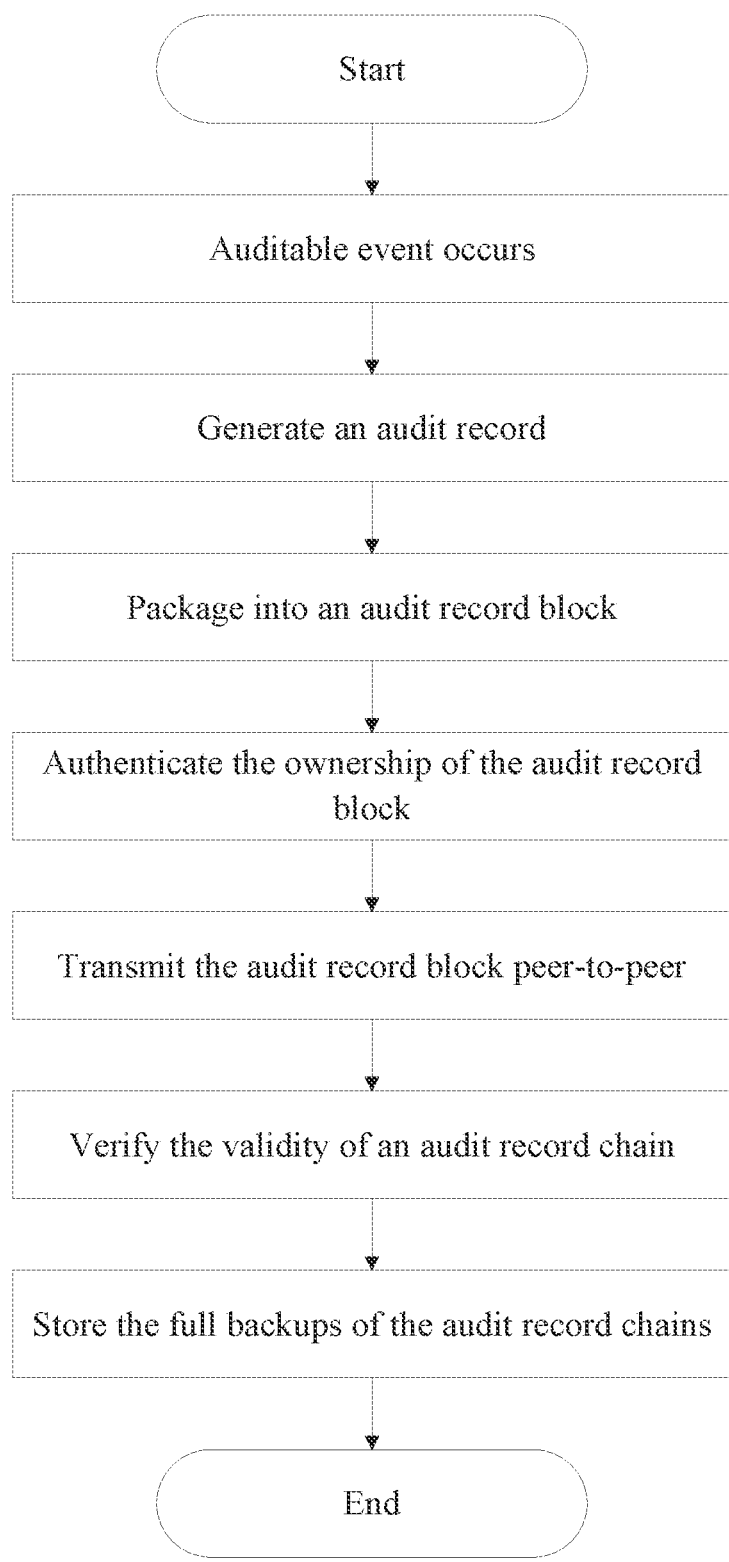
FIG. 1 is a flowchart showing the storage of a database security audit record according to an embodiment of the disclosure.

It should be noted that embodiments of the disclosure and features in the embodiments can be mutually combined without conflicting.

In the description of the disclosure, it is to be understood that the direction or position relationship indicated by the terms "center", "longitudinal", "horizontal", "upper", "lower", "front", "rear", "left", "right", "vertical", "horizontal", "top", "bottom", "inside", "outside" and the like is a direction or position relationship as shown in the drawings, which is only for conveniently describing the disclosure and simplifying the description rather than indicating or implying that the indicated device or element must have a specific direction or must be constructed and operated in a specific direction, and therefore cannot be understood as a limitation of the disclosure. In addition, the terms "first", "second" and the like are only used for the purpose of description and cannot be understood as indicating or implying relative importance or implicitly indicating the quantity of the technical features. Accordingly, features defining "first", "second" and the like may explicitly or implicitly include one or more of the features. In the description of the disclosure, unless otherwise stated, "multiple" means two or more.

In the description of the disclosure, it should be noted that unless otherwise specified and defined, the terms "installation", "linkage" and "connection" should be understood in a broad sense, for example, it can be fixed connection or detachable connection or integrated connection; mechanical connection, or electrical connection; direct connection or indirect connection via an intermediate medium, or communication of interiors of two elements. For those of ordinary skill in the art, the specific meaning of the above terms in the disclosure can be understood through specific circumstances.

The disclosure will be described in detail with reference to drawings and in combination with embodiments in the following.

Figure 3:
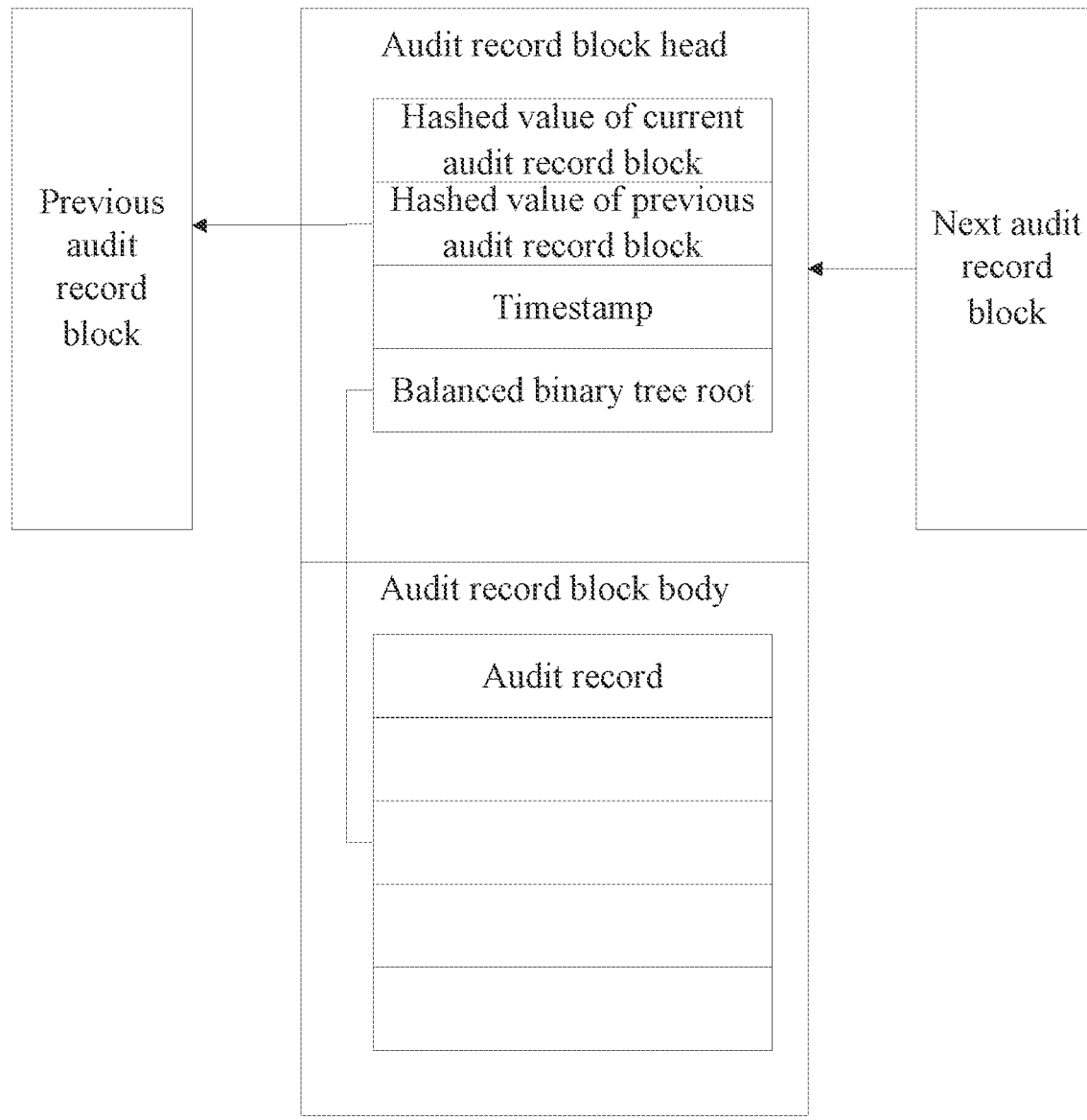
FIG. 3 is a structural diagram of a database security audit record chain according to an embodiment of the disclosure.

The disclosure provides a method for storing database security audit records, as shown in FIG. 1-FIG. 3, which is used for ensuring that the database security audit record cannot be tampered and forged. In order to achieve the above purpose, the technical solution provided in the disclosure is as follows: storage of database security audit records (hereinafter "audit records") is achieved by adopting the technologies of peer-to-peer transmission, consensus algorithm and encryption algorithm.

(1) The database security audit record block (hereinafter "audit record block") is a package of several audit records. The database security audit record chain (hereinafter "audit record chain") is a data structure formed by orderly connecting the database security audit record blocks from back to front according to the order of time when the database security audit record blocks are generated.

(2) A peer-to-peer protocol for direct network communication between two nodes is adopted, the network has no center node, and each node transmits the audit record block peer-to-peer.

(3) The ownership verification of the audit record blocks is performed by adopting the asymmetric encryption algorithm, thereby ensuring the security of audit record block transmission.

(4) The full backups of the audit record chains are stored in each node to store the audit records in the balanced binary tree structure.

(5) Consistency verification is performed on the audit record chains of different nodes by adopting a proof of stake consensus algorithm.

Particularly, a method for storing database security audit records, as shown in FIG. 1, includes:

S1, when a database server recognizes an auditable event to generate one database security audit record, this database security audit record is identified with a hashed value so that each audit record corresponds to a unique hashed value respectively;

S2, multiple audit records are packaged into an audit record block; when the number of the audit records reaches an upper limit, or when time limit for packaging is reached, the multiple audit records are packaged as a new audit record block; through an audit record package mechanism, frequency of encryption, propagation and verification processing of the peer-to-peer network node is effectively reduced;

S3, the audit record block is transmitted in encrypted way by adopting a peer-to-peer protocol for direct network communication between two nodes, and the ownership of the audit record block is verified; after the new audit record block is generated, the node for generating the new audit record block broadcasts the new generated audit record block to other nodes of the whole network through the peer-to-peer network; the peer-to-peer network has no center node, each node is peer-to-peer and jointly provides service for the whole network, each node can respond to a request as a server or uses service provided by other nodes as a client, and each node undertakes a network route and functions for verifying audit record blocks and broadcasting the audit record blocks; by allowing each node to participate in the validity verification of the audit record blocks, it is ensured that the audit record cannot be tampered;

S4, the node for receiving the audit record blocks verifies the validity of the audit record blocks, the valid audit record block is connected to the audit record chain, and the valid audit record block is forwarded to the adjacent nodes; specifically, the audit record chain is composed of audit record blocks connected together; if the audit record block is valid, it is connected to the audit record chain, and forwarded to the adjacent node continuously; if the audit record block is invalid, it is discarded immediately;

S5, the consistency of the audit record chains of different nodes is verified;

S6, the full backups of the audit record chains are stored in all the nodes, and multiple audit records are stored in a balanced binary tree structure.

The data structure of the audit record in the step S1, as shown in FIG. 2, includes: the hashed value acting as a unique identifier of this database security audit record; the audit event for identifying an event code; a timestamp for identifying time when the audit event occurs; a host name for identifying a name of the host for executing the audit event; a database server name for identifying a name of the database server on which the audit event runs; a user name for identifying a login name of a user requesting the audit event; and an additional field for identifying an arbitrary field of databases, tables and the like for database security audit analysis. Adoption of the above audit record data structure is conducive to not only organizing multiple audit records into the audit record block body, but also collecting information of auditable events in the database to perform database security audit analysis.

The specific method for generating the audit record block in the step S2 is as follows:

S21, multiple audit records are packaged after a while; the audit record block consists of an audit record block head and an audit record block body; the audit record block head includes the hashed value, the timestamp and a balanced binary tree root of the current audit record block, and a hashed value of the previous audit record block; the audit record block body includes several audit records;

S22, the several audit records are stored in the audit record block body in a balanced binary tree structure, and each leaf of the balanced binary tree is the hashed value of one audit record;

S23, hashing operation is recursively performed on hashed values of every two audit records to obtain a new hashed value and the new hashed value is stored into the balanced binary tree until every two hashed values are combined to finally obtain one hashed value, namely the balanced binary tree root, and the balanced binary tree root is a digital finger for these audit records; if the roots of two balanced binary trees are consistent, these two trees are inevitably identical; a hash algorithm transforms an input of any length into a hashed value output of a fixed length, and the space of the hashed value is usually far smaller than the space of input, and contents of input cannot be reversely deduced according to the hashed value; the hash algorithm is conducive to not only improving the storage and transmission efficiency, but also to increasing the efficiency of the subsequent verification processing.

In the step S4, as shown in FIG. 3, the audit record chain is a data structure formed by orderly connecting the audit record blocks from back to front according to the order of time when the audit record blocks are generated.

The method for verifying the audit record block in the step S4 comprises:

S41, the ownership of the audit record block is verified by adopting an asymmetric cryptographic algorithm; the asymmetric cryptographic algorithm includes a public key and a private key, namely, the public key of one node is public to other nodes, the private key is confidential to the other nodes, the private key is configured to be unavailable to the other nodes through calculations according to the public key; for example, if the plaintext is encrypted by using the public key, the cyphertext can be decrypted only by the corresponding private key; if the plaintext is encrypted by using the private key, the cyphertext can be decrypted only by the corresponding public key the asymmetric encryption algorithm can allow two nodes to exchange information in an insecure network to safely reach the consistency of information, thereby improving the security of peer-to-peer network transmission; and S42, The timestamp and audit record structure of the new audit record block are checked according to a predefined standard.

The method for checking the audit record chain in the step S5 is as follows: verifying the consistency of the audit record chains of different nodes by adopting a proof of stake consensus algorithm. The consensus mechanism is a mathematical algorithm that confidence is established among different nodes to acquire stake; in the peer-to-peer network, each node stores the full backups of the audit record chains, and the consistency verification is performed on the audit record chains of different nodes by adopting the proof of stake consensus algorithm; all nodes in the peer-to-peer network put their possessed stakes into the consensus mechanism to become a verifier; the proof of stake consensus algorithm selects nodes according to the quantity of stakes invested by the verifier among these verifiers, so that it has the right to generate the next audit record block.

The disclosure has the beneficial effects that multiple nodes in the peer-to-peer network all store the audit records, each node stores full audit record chains and can participate in the validity verification of the audit record blocks, the modification of the audit record chain on a single node is invalid, and the proof of stake consensus algorithm ensures that the error of this node can be jointly corrected by other nodes; the ownership verification of the audit record block is performed by adopting the asymmetric encryption algorithm to ensure the security of the transmission and access of the audit record blocks. Through the encryption mechanism and the consensus mechanism, the disclosure realizes the storage of the audit records in the peer-to-peer network, thereby ensuring that the audit records cannot be tampered and forged.

The above description is only preferred embodiments of the disclosure, but not intended to limit the disclosure. Any modifications, equivalent replacements and improvements and the like made within the spirit and principle of the disclosure should be included in the protective scope of the disclosure.

We claim:

1. A method for storing database security audit records, comprising:

S1, when a database server recognizes an auditable event to generate one database security audit record, identifying the database security audit record with a hashed value so that each database security audit record corresponds to a unique hashed value respectively;

S2, packaging multiple database security audit records into a database security audit record block;

S3, transmitting the database security audit record block in encrypted way by adopting a peer-to-peer protocol for direct network communication between two nodes, and verifying an ownership of the database security audit record block; wherein after a new database security audit record block is generated, a node for generating the new database security audit record block broadcasts the new generated database security audit record block to other nodes of the whole network through the peer-to-peer network;

S4, a node for receiving the database security audit record block verifying validity of the database security audit record block, connecting a valid database security audit record block to a database security audit record chain, and forwarding the valid database security audit record block to adjacent nodes;

S5, verifying consistency of database security audit record chains of different nodes; and S6, storing full backups of the database security audit record chains on all nodes, and storing multiple database security audit records in a balanced binary tree structure by each database security audit record block.

2. The method for storing database security audit records according to claim 1, wherein a data structure of the database security audit record in the step S1 comprises:

the hashed value acting as a unique identifier of the database security audit record;

the audit event for identifying an event code;

a timestamp for identifying time when the audit event occurs;

a host name for identifying a name of the host for executing the audit event;

a database server name for identifying a name of the database server on which the audit event runs;

a user name for identifying a login name of a user requesting the audit event; and an additional field for identifying an arbitrary field of the database for database security audit analysis.

3. The method for storing database security audit records according to claim 1, wherein a specific method for generating the database security audit record block in the step S2 comprises:

S21, dividing a database security audit record block into a database security audit record block head and a database security audit record block body, wherein the database security audit record block head comprises the hashed value, a timestamp and a balanced binary tree root of the current database security audit record block, and the hashed value of a previous database security audit record block; and the database security audit record block body comprises several database security audit records;

S22, storing the several database security audit records in the database security audit record block body in the balanced binary tree structure, wherein each leaf of the balanced binary tree is the hashed value of one database security audit record respectively; and S23, performing hashing operation recursively to hashed values of every two database security audit records to obtain a new hashed value and storing the new hashed value into the balanced binary tree until every two hashed values are combined to finally form one hashed value, namely the balanced binary tree root.

4. The method for storing database security audit records according to claim 1, wherein in the step S4, the database security audit record chain is a data structure formed by orderly connecting the database security audit record blocks from back to front according to an order of time when the database security audit record blocks are generated.

5. The method for storing database security audit records according to claim 1, wherein a method for verifying the database security audit record block in the step S4 comprises:

S41, verifying the ownership of database security audit record blocks by adopting an asymmetric cryptographic algorithm, wherein the asymmetric cryptographic algorithm includes a public key and a private key, namely, the public key of one node is public to other nodes, the private key is confidential to the other nodes, and the private key is configured to be unavailable to the other nodes through calculations according to the public key; and S42, checking a timestamp and a database security audit record structure of the new database security audit record block according to a predefined standard.

6. The method for storing database security audit records according to claim 1, wherein a method for verifying the database security audit record chain in the step S5 is as follows: verifying the consistency of the database security audit record chains of different nodes by adopting a proof of stake consensus algorithm.

* * * * *